US008953024B2

(12) United States Patent
Wang et al.

(10) Patent No.: US 8,953,024 B2
(45) Date of Patent: Feb. 10, 2015

(54) 3D SCENE MODEL FROM COLLECTION OF IMAGES

(75) Inventors: Sen Wang, Rochester, NY (US); Kevin Edward Spaulding, Spencerport, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 522 days.

(21) Appl. No.: 13/400,663

(22) Filed: Feb. 21, 2012

(65) Prior Publication Data

US 2013/0215233 A1    Aug. 22, 2013

(51) Int. Cl.
H04N 13/04    (2006.01)
H04N 13/02    (2006.01)

(52) U.S. Cl.
CPC .................. *H04N 13/0239* (2013.01)
USPC ........................................................... 348/49

(58) Field of Classification Search
CPC .................................................. H04N 13/0239
USPC ........................................................... 348/49
See application file for complete search history.

(56) References Cited

U.S. PATENT DOCUMENTS

| 7,469,010 | B2 | 12/2008 | Wu et al. | |
| 7,499,586 | B2 * | 3/2009 | Agarwala et al. | 382/154 |
| 7,746,404 | B2 | 6/2010 | Deng et al. | |
| 7,764,844 | B2 | 7/2010 | Bouk et al. | |
| 7,778,491 | B2 * | 8/2010 | Steedly et al. | 382/294 |
| 7,889,948 | B2 * | 2/2011 | Steedly et al. | 382/294 |
| 2002/0191838 | A1 * | 12/2002 | Setterholm | 382/154 |
| 2006/0075442 | A1 | 4/2006 | Meadow | |
| 2006/0221187 | A1 | 10/2006 | Alhadef | |
| 2010/0053347 | A1 | 3/2010 | Agarwala et al. | |
| 2010/0053370 | A1 | 3/2010 | Crisan et al. | |
| 2011/0026764 | A1 | 2/2011 | Wang | |
| 2011/0207074 | A1 * | 8/2011 | Hall-Holt et al. | 433/29 |
| 2013/0053702 | A1 * | 2/2013 | Pfeiffer et al. | 600/476 |

OTHER PUBLICATIONS

Cao et al., "Semi-automatic 2-D-to-3-D conversion using disparity propagation," IEEE Trans. on Broadcasting, vol. 57, pp. 491-499 (2011).
Chen et al., "View interpolation for image synthesis," Proc. SIGGRAPH '93, pp. 279-288 (1993).
Fehn, "Depth-image-based rendering (DIBR), compression, and transmission for a new approach on 3D-TV," Proc. SPIE, vol. 5291, pp. 93-104 (2004).

(Continued)

*Primary Examiner* — Sath V Perungavoor
*Assistant Examiner* — James Pontius

(57) ABSTRACT

A method for determining a three-dimensional model of a scene from a collection of digital images, wherein the collection includes a plurality of digital images captured from a variety of camera positions. A set of the digital images from the collection are selected, wherein each digital image contains overlapping scene content with at least one other digital image in the set of digital images, and wherein the set of digital images overlap to cover a contiguous portion of the scene. Pairs of digital images from the set of digital images to determine a camera position for each digital image. A set of target camera positions is determined to provide a set of target digital images having at least a target level of overlapping scene content. The target digital images are analyzed using a three-dimensional reconstruction process to determine a three-dimensional model of the scene.

20 Claims, 12 Drawing Sheets

(56) References Cited

OTHER PUBLICATIONS

Fitzgibbon et al., "Image-based rendering using image-based priors," International Journal of Computer Vision, vol. 63, pp. 141-151 (2005).
Gortler et al., "The lumigraph," Proc. SIGGRAPH '96, pp. 43-54 (1996).
Guttmann et al. "Semi-automatic stereo extraction from video footage," Proc. IEEE 12th International Conference on Computer Vision, pp. 136-142 (2009).
Knorr et al., "Super-resolution stereo- and multi-view synthesis from monocular video sequences," Proc. Sixth International Conference on 3-D Digital Imaging and Modeling, pp. 55-64 (2007).
Levoy et al., "Light field rendering," Proc. SIGGRAPH '96, pp. 31-42 (1996).
Park et al., "Data-driven mean-shift belief propagation for non-Gaussian MRFs," Proc. IEEE Conference on Computer Vision and Pattern Recognition, pp. 3547-3554 (2010).
Pollefeys et al., "Visual modeling with a handheld camera," International Journal of Computer Vision, vol. 59, pp. 207-232 (2004).
Harman, "Home-based 3-D entertainment—an overview," Proc. International Conference on Image Processing, vol. 1, pp. 1-4 (2000).
Shade et al., "Layered depth images," Proc. SIGGRAPH '98, pp. 231-242 (1998).
Snavely et al., "Photo tourism: Exploring photo collections in 3-D," ACM Transactions on Graphics, vol. 25, pp. 835-846 (2006).
Gaäl, "Depth maps estimation and use for 3DTV," Technical Report 0379, INRIA Rennes Bretagne Atlantique (2010).
Zhang et al., "Stereoscopic video synthesis from a monocular video," IEEE Trans. Visualization and Computer Graphics, vol. 13, pp. 686-696 (2007).
Zhang et al., "Consistent depth maps recovery from a video sequence," IEEE Trans. Pattern Analysis and Machine Intelligence, vol. 31, pp. 974-988 (2009).
Zhang et al., "3D-TV content creation: automatic 2-D-to-3-D video conversion," IEEE Trans. on Broadcasting, vol. 57, pp. 372-383 (2011).
Zitnick et al., "Stereo for image-based rendering using image over-segmentation," International Journal of Computer Vision, vol. 75, pp. 49-65 (2006).
Zitnick et al., "High-quality video view interpolation using a layered representation," ACM Transactions on Graphics, vol. 23, pp. 600-608, 2004.
Chalidabhongse et al., "Fast Motion Vector Estimation Using Multiresolution-Spatio-Temoral Correlations" IEEE Transactions on Circuits and Systems for Video Technology, vol. 7, 1997, pp. 477-488.
Furukawa et al., "Towards Internet-scale Multi-view Stereo," Proc. Computer Vision and Pattern Recognition, 2010, pp. 1434-1441.
Micusik et al., "Piecewise planar city 3D modeling from street view panoramic sequences," Proc. Computer Vision and Pattern Recognition, 2009, pp. 2906-2912.
Pass et al., "Comparing images using color coherence vectors" Proc. Fourth ACM International Conference on Multimedia, 1996, pp. 65-73.
Non-Final Office Action on U.S. Appl. No. 13/400,614, mailed Apr. 9, 2014.
Non-Final Office Action on U.S. Appl. No. 13/400,623, mailed Apr. 21, 2014.
Lowe, "Object recognition from local scale-invariant features," Proc. International Conference on Computer Vision, vol. 2, pp. 1150-1157 (1999).
Fleet et al., "Optical Flow Estimation," chapter 15 in Handbook of Mathematical Models in Computer Vision, Eds., Paragios et al., Springer (2006).
Lowe, "Distinctive image features from scale-invariant keypoints," International Journal of Computer Vision, vol. 60, pp. 91-110 (2004).
Goesele et al., "Multi-view stereo for community photo collections," Proc. International Conference on Computer Vision, pp. 1-8 (2007).
Jancosek et al., "Scalable multi-view stereo," Proc. International Conference on Computer Vision Workshops, pp. 1526-1533 (2009).
Seitz et al., "A comparison and evaluation of multi-view stereo reconstruction algorithms," Proc. Computer Vision and Pattern Recognition, vol. 1, pp. 519-528 (2006).
Final Office Action on U.S. Appl. No. 13/400,614, mailed Oct. 22, 2014.

\* cited by examiner

3D SCENE MODEL FROM COLLECTION OF IMAGES

CROSS-REFERENCE TO RELATED APPLICATIONS

Reference is made to commonly assigned, co-pending U.S. patent application Ser. No. 13/298,332, entitled "Modifying the viewpoint of a digital image", by Wang et al.; to commonly assigned, co-pending U.S. patent application Ser. No. 13/400,614, entitled "3D scene model from video" by Wang et al.; and to commonly assigned, co-pending U.S. patent application Ser. No. 13/400,623, entitled "Key video frame selection method" by Wang et al., each of which is incorporated herein by reference.

FIELD OF THE INVENTION

This invention pertains to the field of digital imaging and more particularly to a method for determining a three-dimensional scene model from a collection of digital images.

BACKGROUND OF THE INVENTION

Much research has been devoted to two-dimensional (2-D) to three-dimensional (3-D) conversion techniques for the purposes of generating 3-D models of scenes, and significant progress has been made in this area. Fundamentally, the process of generating 3-D models from 2-D images involves determining disparity values for corresponding scene points in a plurality of 2-D images captured from different camera positions.

Generally, methods for determining 3-D point clouds from 2-D images involve three main steps. First, a set of corresponding features in a pair of images are determined using a feature matching algorithm. One such approach is described by Lowe in the article "Distinctive image features from scale-invariant keypoints" (International Journal of Computer Vision, Vol. 60, pp. 91-110, 2004). This method involves forming a Scale Invariant Feature Transform (SIFT), and the resulting corresponding features are sometimes referred to as "SIFT features".

Next, a Structure-From-Motion (SFM) algorithm, such as that described Snavely et al. in the article entitled "Photo tourism: Exploring photo collections in 3-D" (ACM Transactions on Graphics, Vol. 25, pp. 835-846, 2006) is used to estimate camera parameters for each image. The camera parameters generally include extrinsic parameters that provide an indication of the camera position (including both a 3-D camera location and a pointing direction) and intrinsic parameters related to the image magnification.

Finally, a Multi-View-Stereo (MVS) algorithm is used to combine the images, the corresponding features and the camera parameters to generate a dense 3-D point cloud. Examples of MVS algorithms are described by Goesele et al. in the article "Multi-view stereo for community photo collections" (Proc. International Conference on Computer Vision, pp. 1-8, 2007), and by Jancosek et al. in the article "Scalable multi-view stereo" (Proc. International Conference on Computer Vision Workshops, pp. 1526-1533, 2009). However, due to scalability issues with the MVS algorithms, it has been found that these approaches are only practical for relatively small datasets (see: Seitz et al., "A comparison and evaluation of multi-view stereo reconstruction algorithms," Proc. Computer Vision and Pattern Recognition, Vol. 1, pp. 519-528, 2006).

Methods to improve the efficiency of MVS algorithms have included using parallelization of the computations as described by Micusik et al. in an article entitled "Piecewise planar city 3D modeling from street view panoramic sequences" (Proc. Computer Vision and Pattern Recognition, pp. 2906-2912, 2009). Nevertheless, these methods generally require calculating a depth map for each image, and then merging the depth map results for further 3D reconstruction. Although these methods can calculate the depth maps in parallel, the depth maps tend to be noisy and highly redundant, which results in a waste of computational effort. Micusik et al. also proposed using a piece-wise planar depth map computation algorithm, and then fusing nearby depth maps, and merging the resulting depth maps to construct the 3D model.

To further improve the scalability, Furukawa et al., in an article entitled "Towards Internet-scale multi-view Stereo" (Proc. Computer Vision and Pattern Recognition, pp. 1063-6919, 2010), have proposed dividing the 3D model reconstruction process into several independent parts, and constructing them in parallel. However, this approach is not very effective in reducing the view redundancy for a frame sequence in a video.

Pollefeys et al., in articles entitled "Visual modeling with a handheld camera" (International Journal of Computer Vision, Vol. 59, pp. 207-232, 2004) and "Detailed real-time urban 3D reconstruction from video" (Int. J. Computer Vision, Vol. 78, pp. 143-167, 2008), have described real-time MVS systems designed to process a video captured by hand-held camera. The described method involves estimating a depth map for each video frame, and then use fusing and merging steps to build a mesh model. However, both methods are only suitable for highly structured datasets (e.g., street-view datasets obtained by a video camera mounted on a moving van). Unfortunately, for consumer videos taken using hand-held video cameras the video frame sequences are more disordered and less structured than the videos that these methods were designed to process. More specifically, the camera trajectories for the consumer videos are not smooth, and typically include a lot of overlap (i.e., frames captured at redundant locations).

In most cases, only some of the 3-D geometry information can be obtained from monocular videos, such as a depth map (see: Zhang et al., "Consistent depth maps recovery from a video sequence," IEEE Trans. Pattern Analysis and Machine Intelligence, Vol. 31, pp. 974-988, 2009) or a sparse 3-D scene structure (see: Zhang et al., "3D-TV content creation: automatic 2-D-to-3-D video conversion," IEEE Trans. on Broadcasting, Vol. 57, pp. 372-383, 2011). Image-based rendering (IBR) techniques are then commonly used to synthesize new views (for example, see the article by Zitnick entitled "Stereo for image-based rendering using image over-segmentation" International Journal of Computer Vision, Vol. 75, pp. 49-65, 2006, and the article by Fehn entitled "Depth-image-based rendering (DIBR), compression, and transmission for a new approach on 3D-TV," Proc. SPIE, Vol. 5291, pp. 93-104, 2004).

With accurate geometry information, methods like light field (see: Levoy et al., "Light field rendering," Proc. SIGGRAPH '96, pp. 31-42, 1996), lumigraph (see: Gortler et al., "The lumigraph," Proc. SIGGRAPH '96, pp. 43-54, 1996), view interpolation (see: Chen et al., "View interpolation for image synthesis," Proc. SIGGRAPH '93, pp. 279-288, 1993) and layered-depth images (see: Shade et al., "Layered depth images," Proc. SIGGRAPH '98, pp. 231-242, 1998) can be used to synthesize reasonable new views by sampling and smoothing the scene. However, most IBR methods either synthesize a new view from only one original frame using little geometry information, or require accurate geometry information to fuse multiple frames.

Existing Automatic approaches unavoidably confront two key challenges. First, geometry information estimated from monocular videos is not very accurate, which can't meet the requirement for current image-based rendering (IBR) methods. Examples of IBR methods are described by Zitnick et al. in the aforementioned article "Stereo for image-based rendering using image over-segmentation," and by Fehn in the aforementioned article "Depth-image-based rendering (DIBR), compression, and transmission for a new approach on 3D-TV." Such methods synthesize new virtual views by fetching the exact corresponding pixels in other existing frames. Thus, they can only synthesize good virtual view images based on accurate pixel correspondence map between the virtual views and original frames, which needs precise 3-D geometry information (e.g., dense depth map, and accurate camera parameters). While the required 3-D geometry information can be calculated from multiple synchronized and calibrated cameras as described by Zitnick et al. in the article "High-quality video view interpolation using a layered representation" (ACM Transactions on Graphics, Vol. 23, pp. 600-608, 2004), the determination of such information from a normal monocular video is still quite error-prone.

Furthermore, the image quality that results from the synthesis of virtual views is typically degraded due to occlusion/disocclusion problems. Because of the parallax characteristics associated with different views, holes will be generated at the boundaries of occlusion/disocclusion objects when one view is warped to another view in 3-D. Lacking accurate 3-D geometry information, hole filling approaches are not able to blend information from multiple original frames. As a result, they ignore the underlying connections between frames, and generally perform smoothing-like methods to fill holes. Examples of such methods include view interpolation (see: Chen et al., "View interpolation for image synthesis," IEEE Trans. on Broadcasting, Vol. 57, pp. 491-499, 2011), extrapolation techniques (see: Cao et al., "Semi-automatic 2-D-to-3-D conversion using disparity propagation," IEEE Trans. on Broadcasting, Vol. 57, pp. 491-499, 2011) and median filter techniques (see: Knorr et al., "Super-resolution stereo- and multi-view synthesis from monocular video sequences," Proc. Sixth International Conference on 3-D Digital Imaging and Modeling, pp. 55-64, 2007). Theoretically, these methods cannot obtain the exact information for the missing pixels from other frames, and thus it is difficult to fill the holes correctly. In practice, the boundaries of occlusion/disocclusion objects will be blurred greatly, which will thus degrade the visual experience.

SUMMARY OF THE INVENTION

The present invention represents a method for determining a three-dimensional model of a scene from a collection of digital images, comprising:

receiving a collection of digital images of a scene, wherein the collection of digital images includes a plurality of digital images captured from a variety of camera positions;

selecting a set of the digital images from the collection of digital images, wherein each digital image in the set of digital images contains overlapping scene content with at least one other digital image in the set of digital images, and wherein the set of digital images overlap to cover a contiguous portion of the scene;

analyzing pairs of digital images from the set of digital images to determine a camera position for each digital image in the set of digital images;

determining a set of target camera positions based on the determined camera positions such that digital images captured at the target camera positions will each have at least a target level of overlapping scene content with at least one other digital image captured at a different target camera position;

selecting a set of target digital images from the set of digital images based on the target camera positions; and analyzing the target digital images using a three-dimensional reconstruction process to determine a three-dimensional model of the scene;

wherein the method is implemented at least in part by a data processing system.

This invention has the advantage that a three-dimensional model can be efficiently determined from a collection of digital images by reducing the number of digital image that are analyzed.

It has the additional advantage that the reduced number of digital images are selected to provide a target level of overlapping scene content.

It has the further advantage that digital images having a low image quality and digital images corresponding to redundant camera positions are eliminated before selecting the target digital images.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
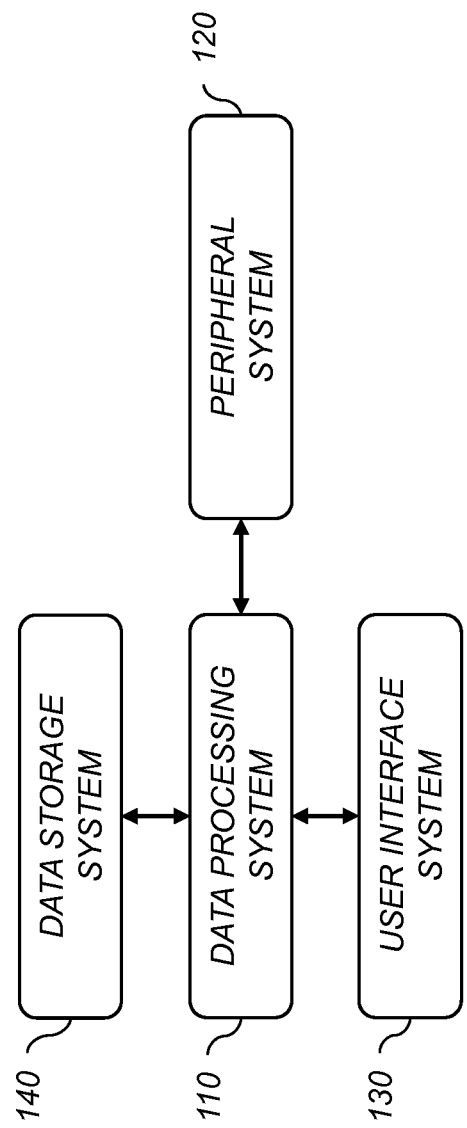
FIG. 1 is a high-level diagram showing the components of a system for processing digital images according to an embodiment of the present invention.

FIG. 1 is a high-level diagram showing the components of a system for processing digital images according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

Figure 2:
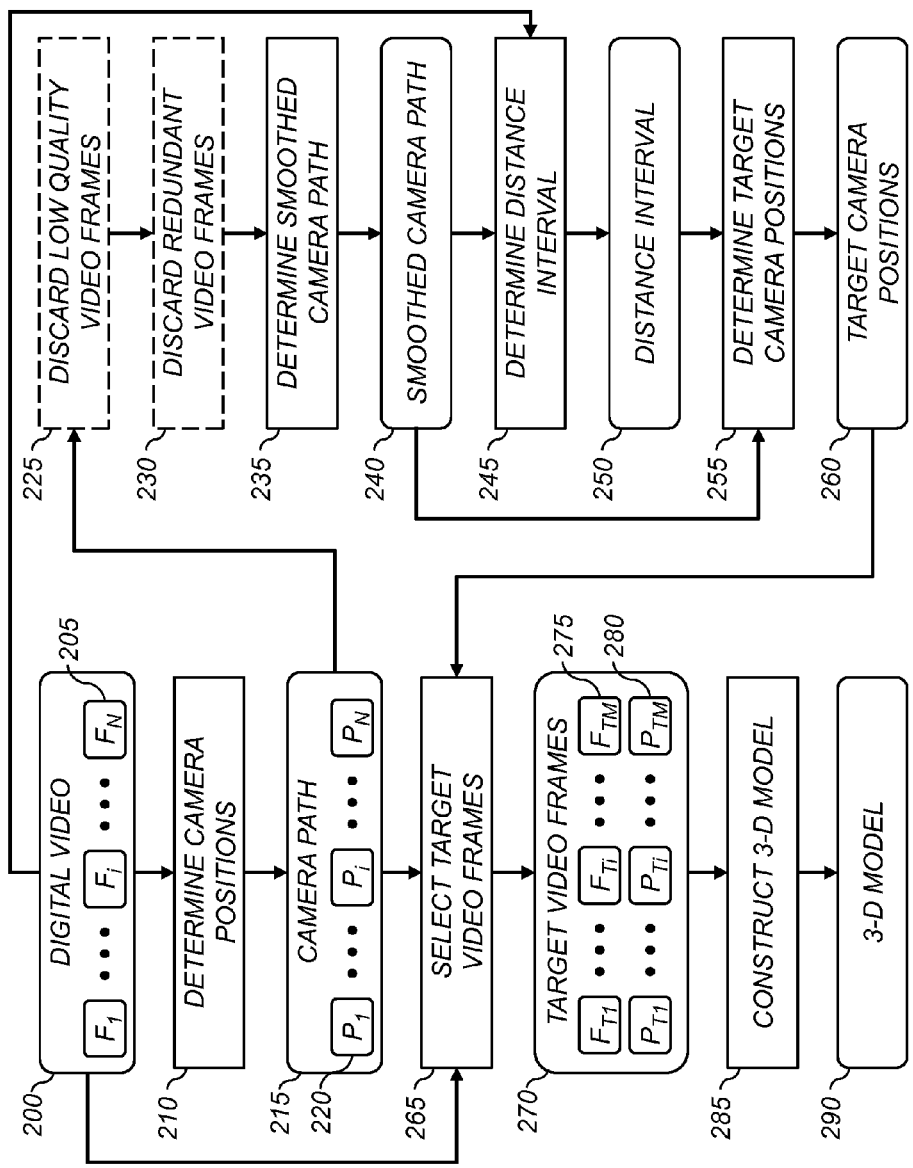
FIG. 2 is a flow chart illustrating a method for determining a 3-D model from a digital video in accordance with the present invention.

FIG. 2 shows an overview of a method for forming a 3-D model 290 of a scene from a digital video 200 of the scene according to an embodiment of the present invention. The digital video 200 includes a temporal sequence of N video frames 205 ($F_1$-$F_N$), each video frame 205 having an array of image pixels. The digital video 200 is captured using a digital video camera whose spatial position was moved during the time that the digital video 200 was captured. The different views of the scene captured from different camera positions can be used to provide the depth information needed to form the 3-D model 290.

A determine camera positions step 210 is used to determine camera positions 220 ($P_1$-$P_N$) corresponding to each of the video frames 205. The sequence of camera positions 220 define a camera path 215. In a preferred embodiment, the camera positions 220 are represented using a set of extrinsic parameters that provide an indication of the camera position of the digital video camera at the time that each video frame 205 was captured. Generally, the camera position 220 determined for a video frame 205 will include both a 3-D camera location and a pointing direction (i.e., an orientation) of the digital video camera. In a preferred embodiment, the extrinsic parameters for the $i^{th}$ video frame 205 ($F_i$) include a translation vector ($T_i$) which specifies the 3-D camera location relative to a reference location and a rotation matrix ($M_i$) which relates to the pointing direction of the digital camera.

The camera positions 220 can be determined using any method known in the art. In some embodiments, the digital video camera used to capture the digital video 200 includes one or more position sensors that directly sense the position of the digital camera (either as an absolute camera position or a relative camera position) during the time that the digital video 200 was captured. The sensed camera position information is then stored as metadata associated with the video frames 205 in the file used to store the digital video 200. Common types of position sensors include gyroscopes, accelerometers and global positioning system (GPS) sensors. In this case, the camera positions 220 can be determined by extracting the camera position metadata from the digital video file. In some cases, the extracted camera position metadata may need to be processed to put it into an appropriate form.

In other embodiments, the camera positions 220 can be estimated by analyzing the image content of the digital video 200. In a preferred embodiment, the camera positions 220 can be determined using a so called "structure-from-motion" (SFM) algorithm (or some other type of "camera calibration" algorithm). SFM algorithms are used in the art to extract 3-D geometry information from a set of 2-D images of an object or a scene. The 2-D images can be consecutive frames taken from a video, or pictures taken with an ordinary digital camera from different camera locations. In accordance with the present invention, an SFM algorithm can be used to estimate the camera positions 220 for each video frame 205. In addition to the camera positions 220, SFM algorithms also generally determine a set of intrinsic parameters related to a magnification of the video frames. The most common SFM algorithms involve key-point detection and matching, forming consistent matching tracks and solving for camera parameters.

An example of an SFM algorithm that can be used to determine the camera positions 220 in accordance with the present invention is described in the aforementioned article by Snavely et al. entitled "Photo tourism: Exploring photo collections in 3-D." In a preferred embodiment, two modifications to the basic algorithms are made. 1) Since the input is an ordered set of 2-D video frames 205, key-points from only certain neighborhood frames are matched to save computational cost. 2) To guarantee enough baselines and reduce the numerical errors in solving camera parameters, some video frames 205 are eliminated according to an elimination criterion. The elimination criterion is to guarantee large baselines and a large number of matching points between consecutive video frames 205. The camera positions 220 are determined for the remaining subset of the video frames 205 using a first pass of the SFM algorithm. These camera positions 220 are then used to provide initial values for a second run of the SFM algorithm using the entire sequence of video frames 205.

The determined camera path 215 for the case where the input digital video 200 is a casual video (e.g., a video captured using a handheld consumer digital video camera) is often very jerky and redundant. Additionally, the digital video 200 may contain some video frames 205 that have a poor image quality (e.g., due to defocus or motion blur).

Video frames 205 that have a low image quality level are generally not desirable for use in determining a high-quality 3-D model 290. In some embodiments, an optional discard low quality video frames step 225 is used to analyze the video frames 205 to identify any that have a low image quality level and discard them. Any method known in the art for analyzing a digital image to determine a corresponding image quality metric value can be used in accordance with the present invention. Any video frames having image quality metric values lower than a predefined threshold can then be discarded. In various embodiments, the image quality metric values can be determined based on estimating image quality attributes such as image sharpness, image blur, image noise, or combinations thereof.

Many methods for estimating image quality attributes for a digital image are well-known in the art. For example, U.S. Pat. No. 7,764,844 to Bouk et al., entitled "Determining sharpness predictors for a digital image," which is incorporated herein by reference, discloses one method for computing image quality metric values that can be used in accordance with the present invention. This method involves determining an image sharpness attribute by computing various statistics related to the spatial frequency content in a digital image.

Figure 3A:
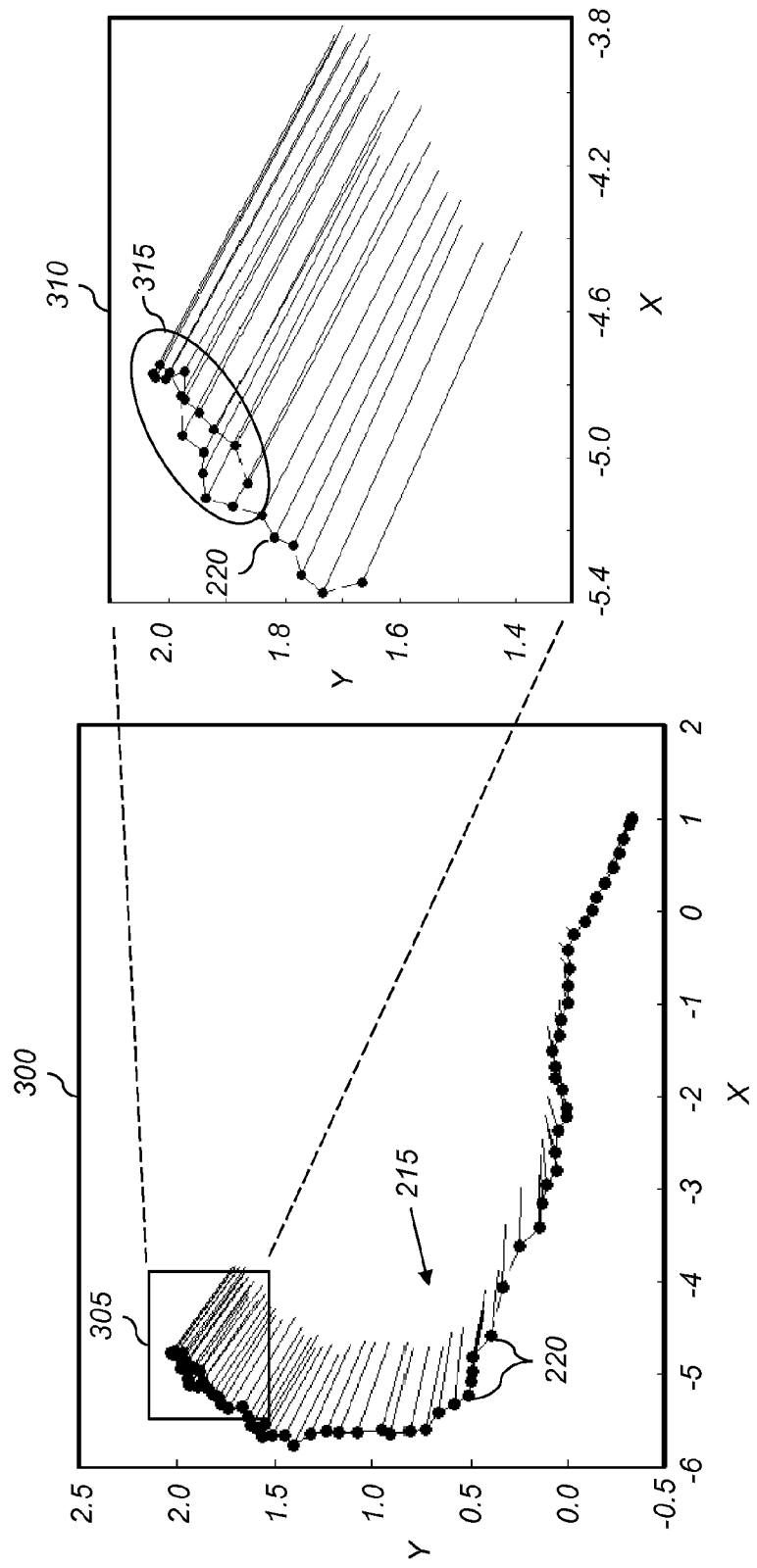
FIG. 3A is a graph showing an example camera path with redundant camera positions.

Redundant video frames are also not very useful in the process of determining a high-quality 3-D model 290 since they do not provide any additional new information about the scene. FIG. 3A shows a graph 300 of a camera path 215 including a set of camera positions 220 determined for a typical handheld consumer video. It can be seen that the camera path 215 is not smooth due to jerky movements of the digital video camera. Furthermore, the inset graph 310, which shows a close-up of the inset region 305 shows that there are a number of redundant camera positions 315 where the photographer paused the camera motion and moved back over essentially the same camera positions.

Returning to a discussion of FIG. 2, in a preferred embodiment, a path tracing process is used to remove any duplicate or redundant parts of the camera path 215, and then obtain a smoothed camera path 240. First, an optional discard redundant video frames step 230 is used to discard any video frames 205 having a camera position 220 that is redundant with other video frames 205. There are a variety of methods that the discard redundant video frames step 230 can use to identify video frames 205 having redundant camera positions so that they can be discarded.

One simple way that the discard redundant video frames step 230 can discard the redundant video frames 205 is to calculate a distance metric between the camera position 220 of a particular video frame 205 and the camera positions 220 for other nearby video frames 205. Any video frames that are closer than a predefined distance threshold can be discarded. This process can be iteratively repeated until all of the remaining video frames 205 are separated by more that the distance threshold. In some embodiments, the distance metric is the Euclidean distance between the 3-D coordinates of the digital camera associated with the camera positions 220. In other embodiments, the Euclidean distance can also include the three additional dimensions corresponding to the pointing direction.

In a preferred embodiment, the discard redundant video frames step 230 uses the following algorithm to discard the redundant video frames. Initially, the video frames 205 and the corresponding camera positions are numbered from 1 to N, where N is the number of video frames 205 in the digital video 200. A frame interval is defined, which in the preferred embodiment is set to have a value of 4. Starting from a first camera position ($P_A$) a second camera position ($P_A$) is selected that is the separated by first camera position by the frame interval. (For example, for the first iteration, $P_A=P_1$ and $P_B=P_{1+4}=P_5$.) An expected camera path is defined by a straight line between the first and second camera positions ($P_A$ and $P_B$), and an intermediate camera position (IP) is defined halfway between these two points:

$$IP=(P_A+P_B)/2 \qquad (1)$$

A sphere of radius R is then drawn around the intermediate camera position IP, and all camera positions $P_i$ falling within the sphere are identified (i.e., those points $P_i$ where $\|P_i-IP\|<R$). In some embodiments, the radius R is a predefined constant. In other embodiments, the radius R can be determined adaptively as a function of the difference between the camera positions. For example, R can be set to be ¼ of the distance between the camera positions $P_A$ and $P_B$ (i.e., $R=\|P_B-P_A\|/4$).

All of the camera positions $P_i$ that were identified to be within the sphere are removed from the camera path 215 and replaced by a single new camera position, providing a pruned set of camera positions. In the preferred embodiment, the new camera position is the average of all the camera positions $P_i$ that were removed. In other embodiments, different strategies can be used to define the new camera position. For example, the camera position $P_i$ closest to the intermediate camera position IP retained for the new camera position.

This process is then repeated iteratively for the rest of the points along the camera path 215. In a preferred embodiment, the second camera position from the first iteration is used as the new first camera position for the second iteration (e.g., $P_A=P_5$), and the new second camera position is selected from the pruned set of camera positions according to the frame interval (e.g., $P_B=P_{5+4}=P_9$).

Figure 3B:
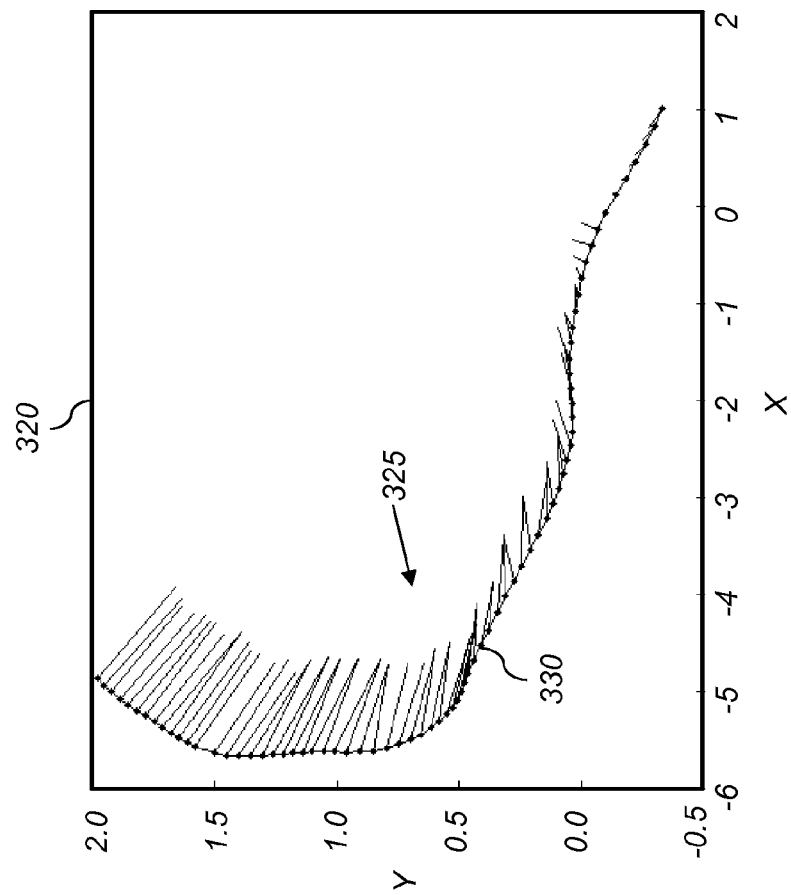
FIG. 3B is a graph showing an example camera path where redundant camera positions have been discarded.

After the iterative process is completed the camera path 215 will contain only camera positions 220 that are non-redundant. FIG. 3B shows a graph 320 of a non-redundant path 325 that was formed by discarding the redundant points in the camera path 215 of FIG. 3A. The non-redundant path 325 includes only non-redundant camera positions 330.

Returning to a discussion of FIG. 2, a determine smoothed camera path step 235 is used to determine a smoothed camera path 240 through the remainder of the camera positions 220 that have not been discarded. Those skilled in the art will recognize that many other types of smoothing processes are known in the art for fitting a smooth function to a set of points that can be used in accordance with. In a preferred embodiment, the determine smoothed camera path step 235 fits a spline function to the remainder of the camera positions 220, for example by using a least-squares fitting process.

Figure 4A:
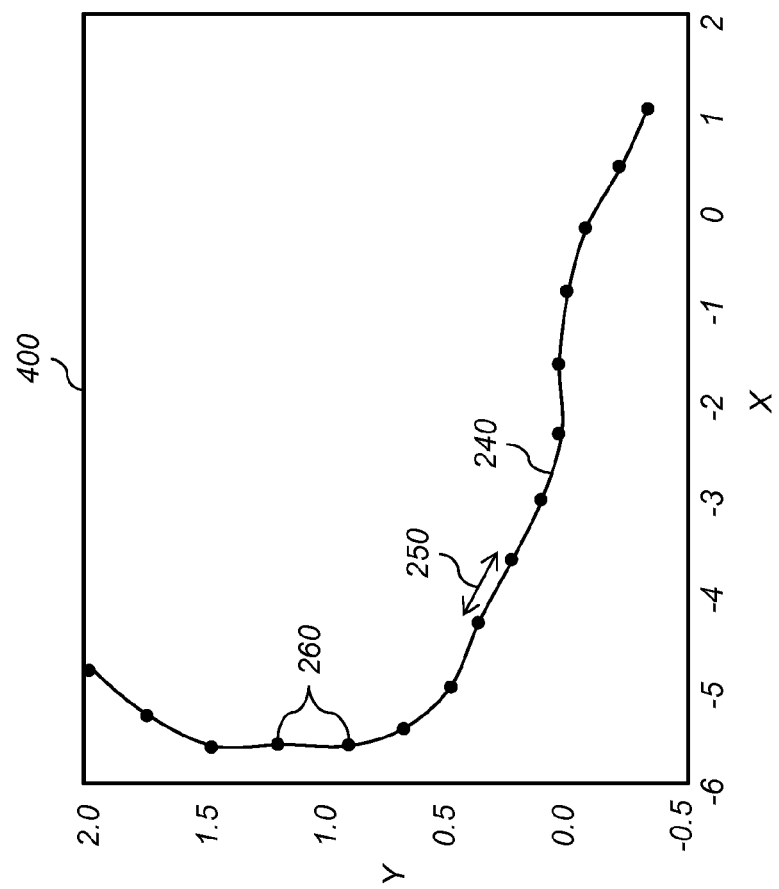
FIG. 4A is a graph showing a set of target camera positions selected according to a determined distance interval.

FIG. 4A shows a graph 400 of a smoothed camera path 240 determined for the camera path 215 of FIG. 3A. It can be seen that the smoothed camera path 240 does not include any of the jerky and redundant behavior that was present in the camera path 215.

Continuing with a discussion of FIG. 2, a determine distance interval step 245 is next used to determine a distance interval 250. The goal of this step is to determine the distance interval 250 that will be used to select a set of target video frames 270, which are a subset of the original video frames 205. The set of target video frames 270 will include M individual target video frames 275 ($F_{T1}$-$F_{TM}$) having associated camera positions 280 ($P_{T1}$-$P_{TM}$).

The target video frames 275 will be analyzed to form the 3-D model 290. In order to have the information needed to build the 3-D model 290, it is necessary that each of the target video frames 275 include redundant scene content with other target video frames 275. However, for computational efficiency purposes it is desirable to reduce the number of target video frames 275 to the minimum number that are needed to provide sufficient accuracy in the 3-D model. In a preferred embodiment, the distance interval 250 represents the largest spatial distance along the smoothed camera path 240 such that pairs of video frames 205 captured at camera positions 220 separated by the distance interval 250 will include at least a threshold level of overlapping scene content.

The determine distance interval step 245 can determine the distance interval 250 using a variety of different algorithms. In a preferred embodiment, the distance interval is determined using an iterative search process. For example, a reference video frame (e.g., $F_R=F_1$) can be selected from which the amount of overlapping scene content can be determined. A reference position is found corresponding to the nearest point on the smoothed camera path 240 to the camera position for the reference video frame. The distance interval 250 is then initialized to some predetermined value (preferably a small value which is likely to produce a large amount of scene content). A test position on the smoothed camera path 240 is then determined, where the distance along the smoothed camera path 240 from the reference position to the test position is equal to the distance interval 250. A test video frame (FT) is then selected from the set of video frames 205 having the closest camera position 220 to the test position. The amount of overlapping scene content is then determined between the reference video frame and the test video frame and compared to the threshold level of overlapping scene content. The distance interval 250 is then iteratively increased by a predefined increment and a new level of overlapping scene content is determined. This process is repeated until the determined amount of overlapping scene content falls below the threshold level of overlapping scene content. The distance interval 250 is then set to be the last distance where the amount of overlapping scene content exceeded the threshold. In other embodiments, the increment by which the distance interval is incremented can be adjusted adaptively to speed up the convergence process.

The amount of overlapping scene content can be determined in a variety of different ways in accordance with the present invention. In a preferred embodiment, the amount of overlapping scene content is characterized by a number of matching features determined between the reference video frame and the test video frame. For example, the matching features can be SIFT features as determined using the method described by the aforementioned article by Lowe in entiteld "Distinctive image features from scale-invariant keypoints," which is incorporated herein by reference.

In another embodiment, a global motion vector is determined between the reference video frame and the test video frame. The border of the reference video frame can then be shifted by the global motion vector to provide a shifted border position. The overlap area of the original border and the shifted border can then be determined and used to characterize the amount of overlapping scene content. In this case, the threshold level of overlapping scene content can be specified as a required percentage of overlap (e.g., 70%).

In some embodiments, the distance interval 250 is determined relative to a single reference video frame and it is assumed that other frames separated by the distance interval 250 will also provide the desired amount of overlapping scene content. In other embodiments, it may be desirable to verify that the distance interval 250 provides at least the threshold amount of overlapping scene content all the way along the smoothed camera path 240, and if not reduce it accordingly.

Once the distance interval 250 has been determined, a set of target camera positions 260 is determined using a determine target camera positions step 255. In a preferred embodiment, the target camera positions 260 are determined by defining a first target camera position 260 corresponding to one end of the smoothed camera path 240, and then defining a sequence of additional target camera positions 260 by moving along the smoothed camera path 240 by the distance interval 250.

Referring to FIG. 4A, a set of target camera positions 260 represented by the black circles are shown spaced out along the smoothed camera path 240, each separated by the distance interval 250. In this particular example 16 target camera positions 260 were determined.

Returning to a discussion of FIG. 2, a select target video frames step 265 is next used to select a subset of the original set of video frames 205 to be included in the set of target video frames 270. In a preferred embodiment, the target video frames 275 ($Fr_1$-$F_{TM}$) are the video frames 205 having camera positions 220 that are closest to the target camera positions 260. Each target video frame 275 has an associated camera position 280 ($P_{T1}$-$P_{TM}$). In accordance with the present invention, each target video frame 275 should have a sufficient amount of overlapping scene content with at least one of the other target video frames 275 to be useful for determining the 3-D model 290.

Figure 4B:
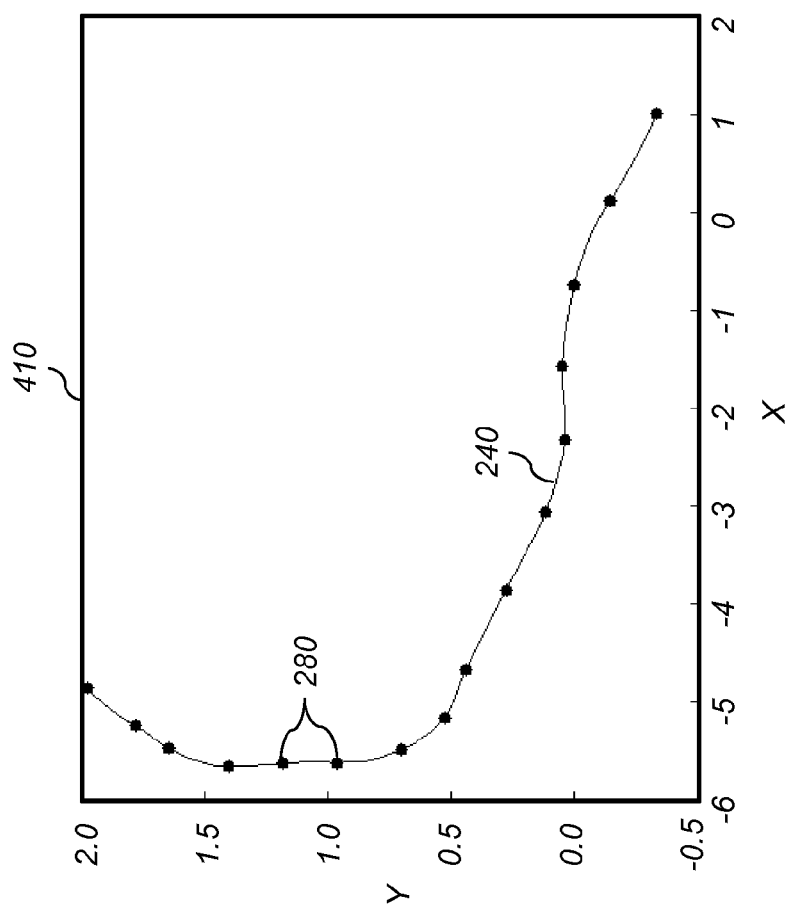
FIG. 4B is a graph showing a set of target camera positions selected according to an alternate embodiment.

In other embodiments, a variable distance interval can be used between successive target video frames 275 rather than the fixed distance interval 250 described with respect to FIG. 4A. In this case, the determine distance interval step 245 is omitted and the determine target camera positions step 255 and the select target video frames step 265 can be combined into a single process. In one such embodiment, the first target camera position 260 is defined to correspond to one end of the smoothed camera path 240, and the first video frame 205 is designated to be the first target video frame 275. The distance interval for the next target camera position is iteratively increased to determine the largest distance interval to the next target camera position 260 along the smoothed camera path such that the corresponding target video frame 275 will have a target level of overlapping scene content. This process is repeated until the end of the smoothed camera path 240 is reached. FIG. 4B shows a graph 410 plotting the camera positions 280 for the target video frames 275 (FIG. 2) selected according to this approach. It can be seen that the spacing between the camera positions 280 is not uniform.

Figure 5:
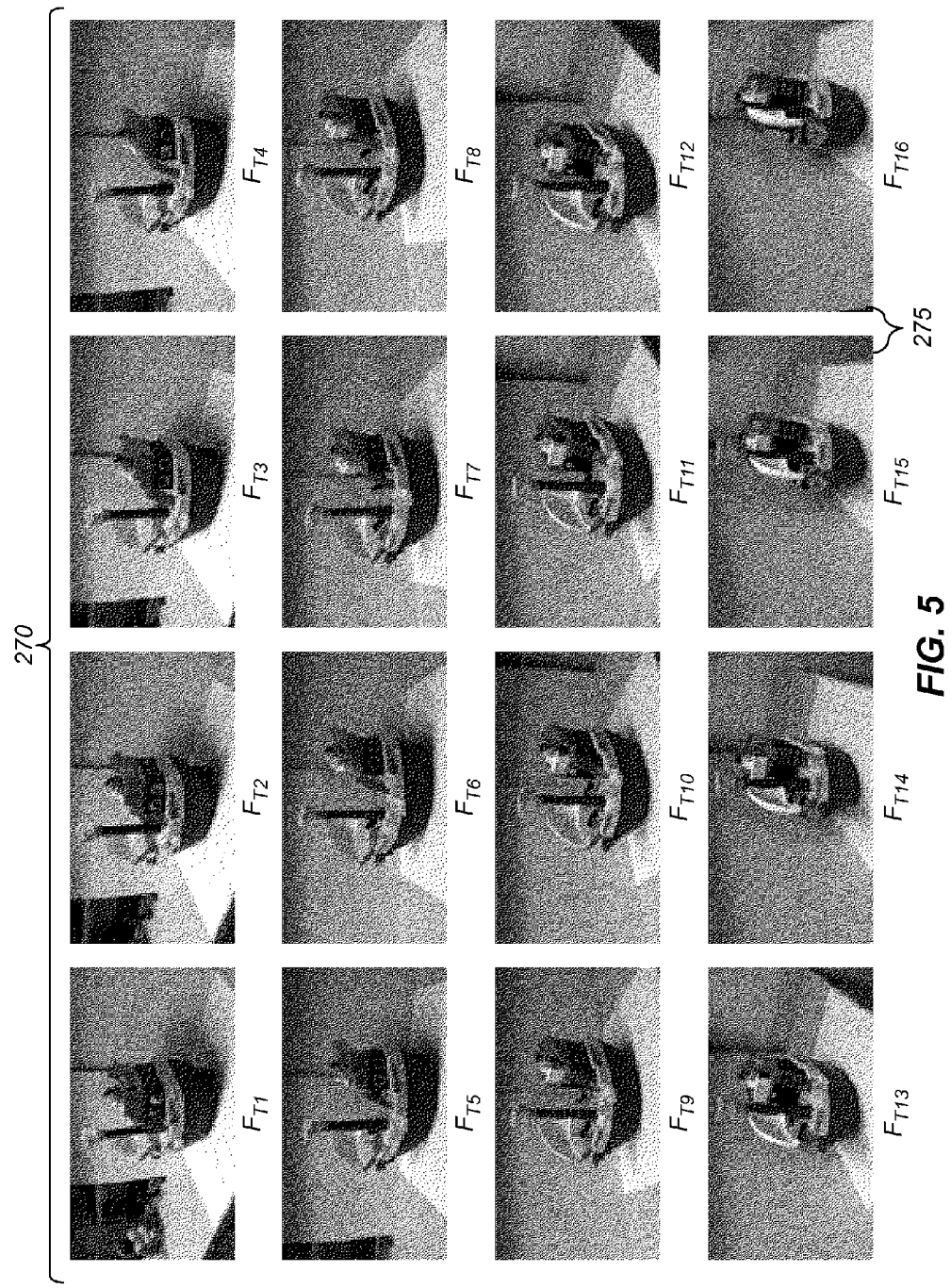
FIG. 5 shows an example set of target video frames selected in accordance with the present invention.

FIG. 5 shows an example set of target video frames 270 including 16 individual target video frames 275 (labeled $F_{T1}$-$F_{T16}$) determined according to the process described with respect to FIG. 4B. It can be seen that each target video frames 275 has a substantial level of overlapping scene content with the preceding and following target video frames 275 in the sequence.

Referring again to FIG. 2, a construct 3-D model step 285 is used to analyze the set of target video frames 270 using a 3-D reconstruction process to determine the 3-D model 290 for the scene. In a preferred embodiment, the 3-D reconstruction process uses a Multi-View-Stereo (MVS) algorithm to construct the 3-D model 290. One such MVS algorithm that can be used in accordance with the present invention is described in the aforementioned article by Furukawa et al. entitled "Towards Internet-scale multi-view Stereo," which is incorporated herein by reference. The input to this MVS algorithm is a set of overlapping digital images (i.e., target video frames 275) and the output is a 3-D point cloud representation of the 3-D model 290. To improve the efficiency of the MVS algorithm, the set of camera positions 280 that have already been determined for the target video frames 275 can be also provided as inputs to the MVS algorithm rather than requiring the MVS algorithm to compute them from scratch.

Figure 6:
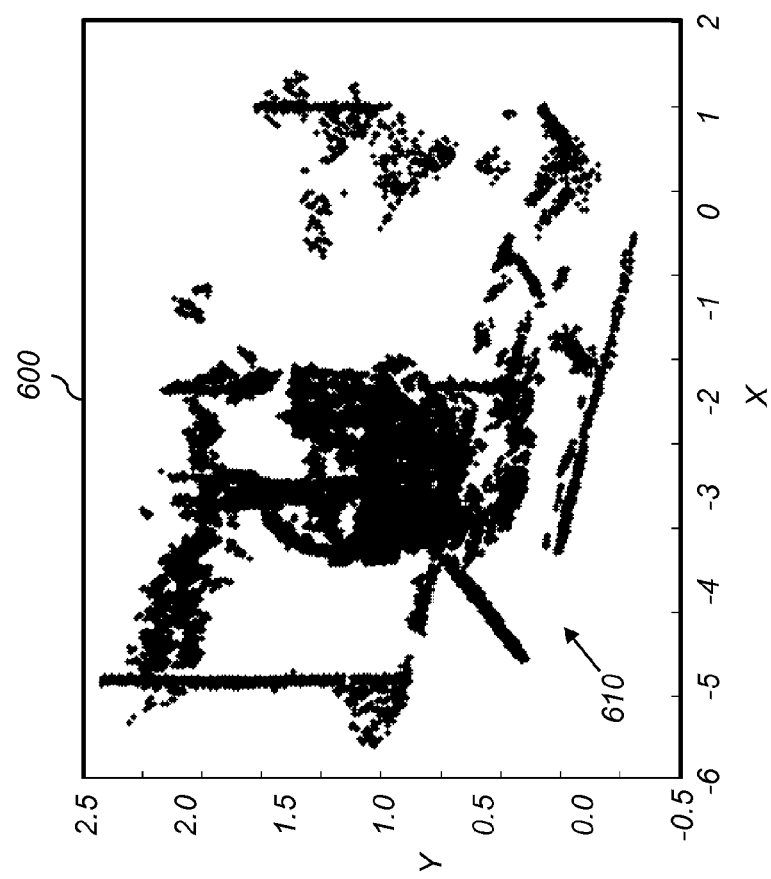
FIG. 6 is a graph illustrating a 3-D point cloud determined in accordance with the present invention.

FIG. 6 is a graph 600 showing an example of a 3-D point cloud 610 determined for the scene depicted in FIG. 5. This 3-D point cloud gives the 3-D coordinates for a set of features in the scene. One skilled in the 3-D modeling art will recognize that the 3-D point cloud 610 can be processed to form other types of 3-D models 290, such as a 3-D mesh model. In some embodiments, the 3-D model 290 can include color information for each point in the scene in addition to the 3-D coordinates.

Figure 7:
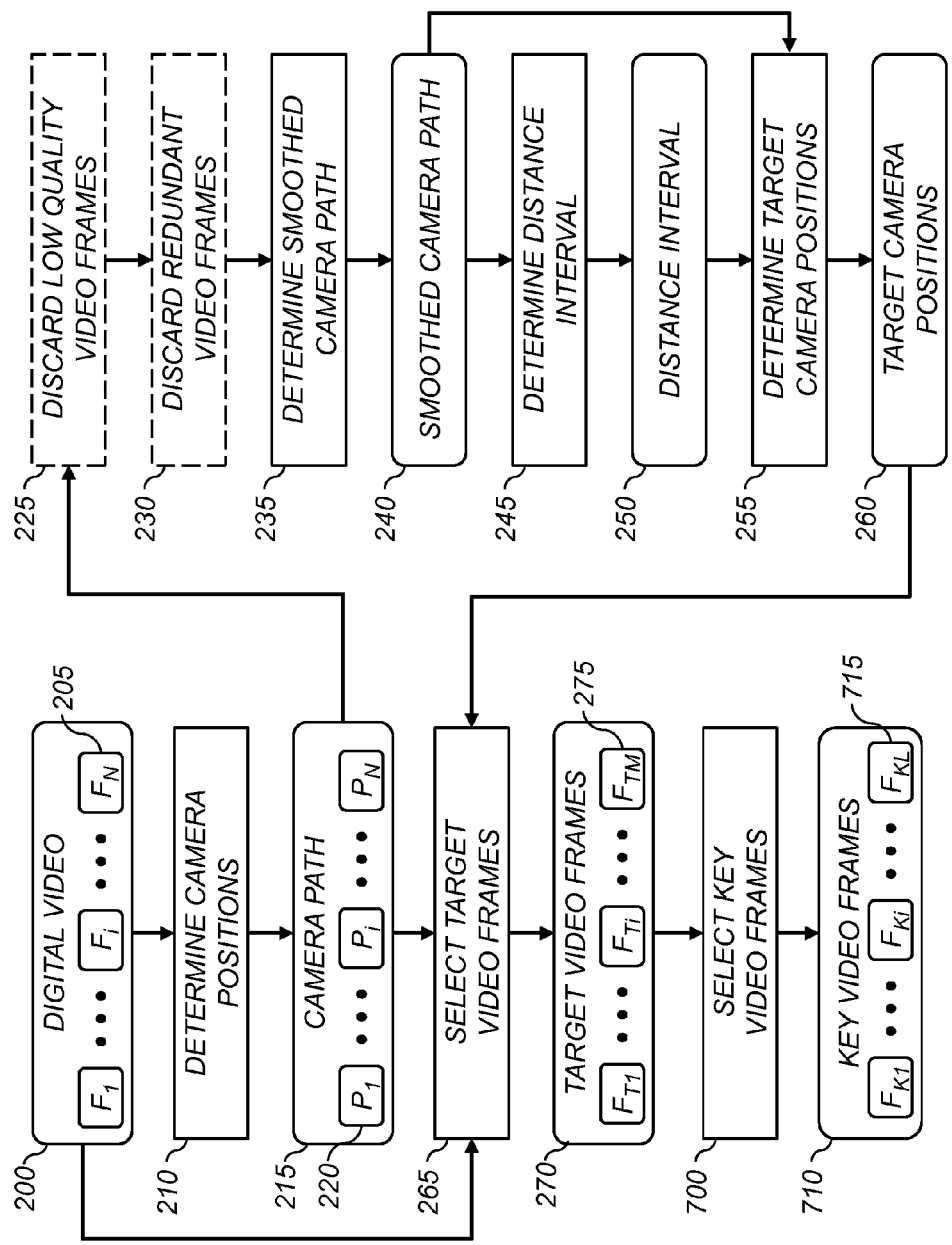
FIG. 7 is a flow chart illustrating a method for selecting a set of key video frames from a digital video in accordance with the present invention.

The set of target video frames 270 (FIG. 2) determined in accordance with the present invention can also be useful for other applications. One such application is for the determination of a set of key video frames 710 for the digital video 200 as illustrated in FIG. 7. In the illustrated embodiment, the process for determining the set of target video frames 270 is identical to that shown in FIG. 2. Once the target video frames 270 are determined, they are used as candidate key video frames for a select key video frames step 700 that selects a subset of the target video frames 270 to define the set of key video frames 710, which includes L individual key video frames 715 ($F_{K1}$-$F_{KL}$). As described with reference to FIG. 2, the target camera positions 260 associated with the target video frames 270 are spaced out along smoothed camera path 240 according to the distance interval 250. Since much of the redundancy in the video frames 205 of the digital video has been eliminated, the process of selecting the key video frames 715 can be significantly more efficient since it is based on a much smaller set of video frames.

The select key video frames step 700 can select the key video frames 715 according to a variety of different methods. In the simplest case, the target video frames 275 are used directly as the key video frames 715. This has the disadvantage that there may be a much larger number of target video frames 275 than the user may want for the set of key video frames 710. Depending on the application, there may be a particular number of key video frames 715 that the user would like to select.

Figure 8:
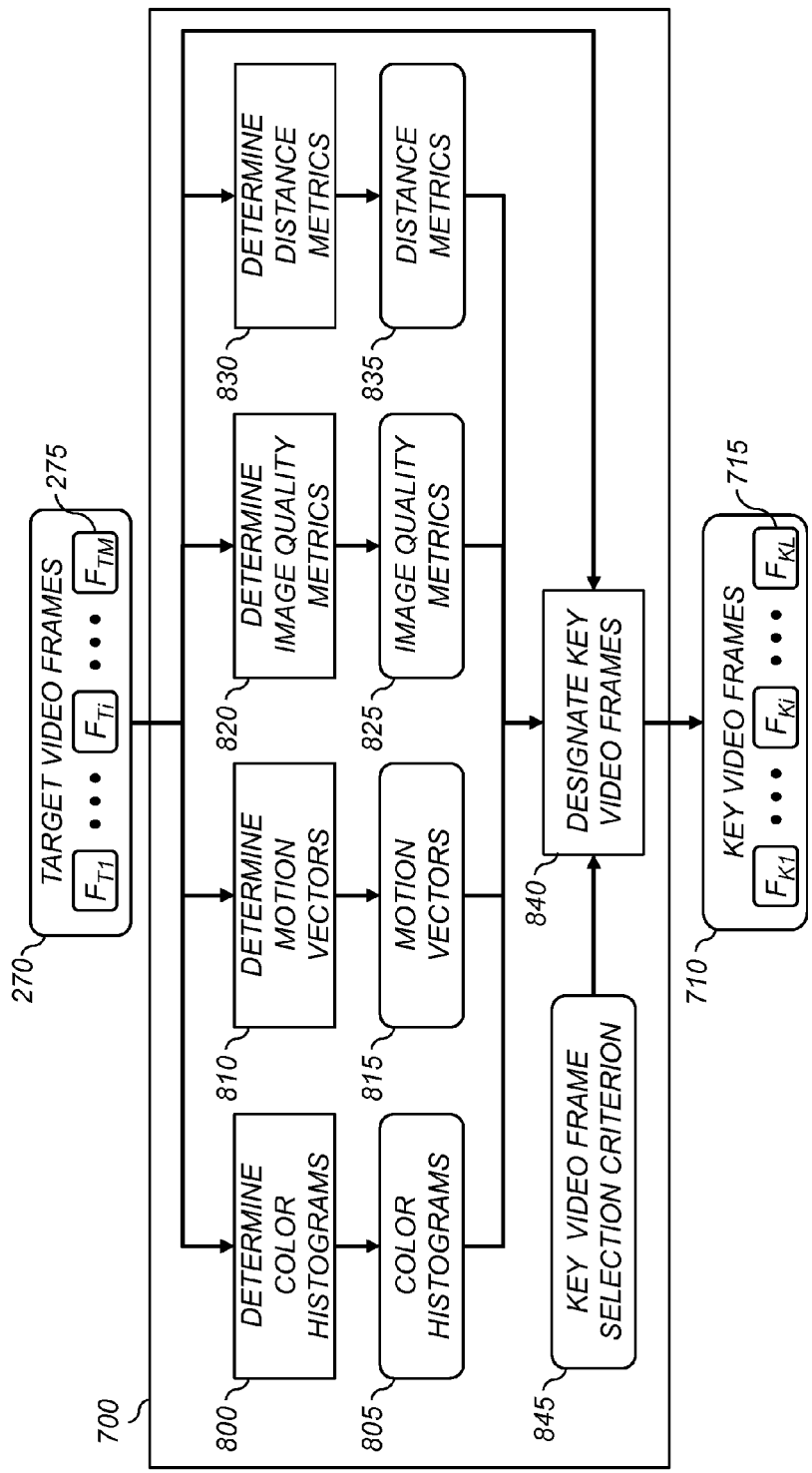
FIG. 8 is a flowchart showing additional details of the select key video frames step of FIG. 7 according to an embodiment of the present invention.

FIG. 8 shows a flowchart giving additional details for the select key video frames step 700 according to a preferred embodiment where a key video frame selection criterion 845 is defined to guide the selection of the key video frames 715. In many applications, it is desirable to avoid selecting key video frames 715 that include scene content similar to other key video frames 715. The key video frame selection criterion 845 can therefore be defined to preferentially select key video frames that have larger differences as characterized by one or more difference attributes. The difference attributes can include, for example, a color difference attribute, an image content difference attribute, a camera position difference attribute or combinations thereof. The key video frame selection criterion 845 can also incorporate other factors such as image quality, or the presence of interesting scene content (e.g., people, animals or objects).

In the illustrated embodiment, a determine color histograms step 800 is used to determine color histograms 805 ($H_i$) for each target video frame 275 ($F_{Ti}$). The color histograms 805 provide an indication of the relative number of image pixels in a particular target video frame 275 that occur within predefined ranges of color values. Such color histograms can be determined using any method known in the art. The color histograms 805 can be stored as a vector of values, and can be used to determine differences between the color characteristics of different video frames 275. In a preferred embodiment, the color histograms can be determined using the method described by Pass et al. in the article entitled "Comparing images using color coherence vectors" ('Proc. Fourth ACM International Conference on Multimedia, pp. 65-73, 1996). This article also described the formation of Color Coherence Vectors (CCVs) which incorporate spatial information together with color information. These CCVs can be used in the present invention as a generalization of a color histogram 805.

A determine motion vectors step 810 determines sets of motion vectors 815 between pairs of target video frames 275. In some embodiments, sets of motion vectors 815 are determined between each target video frame 275 and each of the other target video frames 275. In other embodiments, sets of motion vectors 815 are only determined between pairs of adjacent target video frames 275. The motion vectors provide an indication of the differences in the positions of corresponding features (e.g., SIFT features) in the pair of target video frames 275. Methods for determining motion vectors are well known in the art. In some embodiments, the motion vectors can be determined using the method described by Chalidabhongse et al. in the article entitled "Fast Motion Vector Estimation Using Multiresolution-Spatio-Temporal Correlations" (IEEE Transactions on Circuits and Systems for Video Technology, Vol. 7, pp. 477-488, 1997), which is incorporated herein by reference.

A determine image quality metrics 820 determines image quality metrics 825 ($Q_i$) for each of the target video frames 275. The image quality metrics 825 can be determined by analyzing the target video frames 275 to estimate image quality attributes such as image sharpness, image blur or image noise. In some embodiments, the image quality metrics 825 can be image sharpness metrics determined using the method described in the aforementioned U.S. Pat. No. 7,764,844 to Bouk et al.

A determine distance metrics step 830 determines distance metrics 835 representing distances between the camera positions 220 (FIG. 7) associated with pairs of target video frames 275. In some embodiments, distance metrics 835 are determined between each target video frame 275 and each of the other target video frames 275. In other embodiments, distance metrics 835 are only determined between pairs of adjacent target video frames 275. In a preferred embodiment, the distance metrics 835 are determined by computing the Euclidean distance between the corresponding camera positions 220.

Depending on the form of the key video frame selection criterion 845, it may not be necessary to determine some or all of the color histograms 805, the motion vectors 815, the image quality metrics 825 or the distance metrics 835, or it may be necessary to determine other attributes of the target video frames 275.

In some embodiments, the key video frame selection criterion 845 selects the key video frames 715 to maximize a selection criterion merit function of the form:

$$C_i = \sum_{j=1}^{N_j} w_j C_{i,j} \qquad (2)$$

where $C_i$ is a selection criterion merit value for the $i^{th}$ target video frame 275, $C_{i,j}$ is the $j^{th}$ merit value term for the $i^{th}$ target video frame 275, $w_j$ is a weighting coefficient for the $j^{th}$ merit value term, and $N_j$ is the number of merit value terms. In a preferred embodiment, selection criterion merit values $C_i$ are determined for each of the target video frames 275 and are used to guide the selection of the key video frames 715. Each merit value term $C_{i,j}$ can be defined to characterize a different attribute that relates to the desirability of target video frame 275 to be designated as a key video frame 715.

In some embodiments, a merit function term can be defined that encourages the selection of key video frames 715 having color histograms 805 with larger differences from the color histograms 805 for other key video frames 715. For example, a color histogram merit value term $C_{i,1}$ can be defined as follows:

$$C_{i,1} = \min_c \Delta H_{i,c} \qquad (3)$$

where $\Delta H_{i,c} = \|H_i - H_c\|$ is a color difference value determined by taking the Euclidean distance between the vectors representing the color histogram 805 ($H_i$) for the $i^{th}$ target video frame 275 and the color histogram 805 ($H_c$) for the $c^{th}$ target video frame 275, and the "min" operator selects the minimum color difference across all of target video frames 275 where $c \neq i$. The Euclidean difference of the histograms is computing the square root of the sum of the squared differences between the values in the corresponding histogram cells.

In some embodiments, a merit function term can be defined that encourages the selection of key video frames 715 having a larger amount of "motion" relative to other nearby key video frames 715. For example, a motion vector merit value term $C_{i,2}$ based on the motion vectors 815 ($V_{i \to c}$) determined between the $i^{th}$ target frame and the $c^{th}$ target frame as follows:

$$C_{i,2} = \min_c V_{i,c} \qquad (4)$$

where $V_{i,c} = \text{ave} \|V_{i \to c}\|$ is the average magnitude of the determined motion vectors, and the "min" operator selects the minimum average magnitude of the motion vectors across all of target video frames 275 where $c \neq i$.

In some embodiments, a merit function term can be defined that encourages the selection of key video frames 715 having higher image quality levels. For example, an image quality merit value term $C_{1,3}$ can be defined as follows:

$$C_{i,3} = Q_i \qquad (5)$$

where $Q_i$ is the image quality metric 825 determined for the $i^{th}$ target frame.

In some embodiments, a merit function term can be defined that encourages the selection of key video frames 715 having camera positions that are farther away from the camera positions associated with other key video frames 715. For example, a motion vector merit value term $C_{i,4}$ based on distance metrics 835 ($D_{i,c}$) determined between the $i^{th}$ target frame and the $c^{th}$ target frame as follows:

$$C_{i,4} = \min_c D_{i,c} \qquad (6)$$

where $D_{i,c}$ is the distance between the camera positions of the $i^{th}$ target frame and the $c^{th}$ target frame, and the "min" operator selects the minimum distance across all of target video frames 275 where $c \neq i$.

The selection criterion merit function associated with the key video frame selection criterion 845 is used by a designate key video frames step 840 to designate the set of key video frames 710. The selection criterion merit function can be used to guide the selection of the key video frames in a variety of ways. In some embodiments, selection criterion merit function values ($C_i$) are determined for each of the target video frames 275 and the L video frames with the highest $C_i$ values are selected to be key video frames 715. However, this approach has the disadvantage that the highest $C_i$ values may be for target video frames 275 that are more similar to each other than others would be.

In another embodiment, an iterative process is used to select the key video frames 715. For the first iteration, the target video frame 275 with the lowest $C_i$ value is eliminated, then the $C_i$ values are recomputed for the remaining target video frames 275. The $C_i$ values for some of the remaining video frames will change if they included contributions from differences with the eliminated video frame. This process is repeated until the number of remaining frames is equal to the desired number of key video frames (L).

In another embodiment, an overall selection criterion merit function is defined which is used to combine the $C_i$ values for a candidate set of key video frames 710 to determine an overall selection criterion merit function value ($C_T$) give an indication of the desirability of the candidate set of L key video frames 710:

$$C_T = \sum_{i=1}^{L} C_i \qquad (7)$$

Any nonlinear optimization method known in the art (e.g., a simulated annealing algorithm or a genetic algorithm) can then be used to determine the set of key video frames 710 that maximizes that $C_T$ value.

Once the set of key video frames 710 have been determined, they can be used for a variety of applications. For example, they can be used to create "chapter titles" when creating a DVD from the digital video 200, to create video thumbnails, to create a video summary, to produce "video action prints," to make a photo collage, to extract still image files, or to make individual prints.

Figure 9:
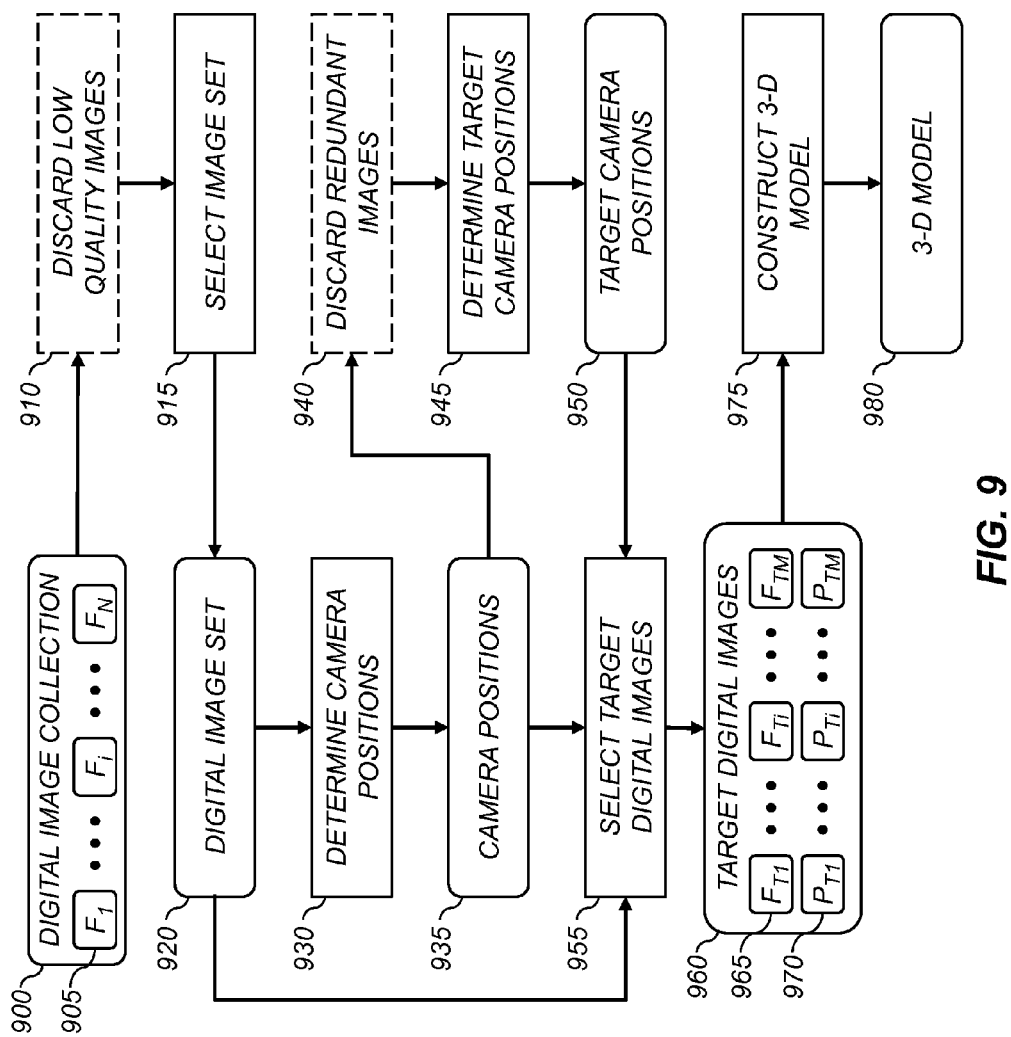
FIG. 9 is a flow chart illustrating a method for determining a 3-D model from a digital image collection in accordance with the present invention.

The methods discussed above for building a 3-D model 290 (FIG. 2) and selecting a set of key video frames 710 from a digital video 200 can be generalized to be applied to a collection of digital still images. FIG. 9 shows an embodiment of the present invention where a 3-D model 290 is constructed from a digital image collection 900. The digital image collection 900 includes a set of N digital image 905 of a common scene captured from a variety of camera positions. In accordance with the present invention, at least some of the digital images 905 overlap to cover a contiguous portion of the scene.

In some embodiments, the digital image collection 900 can be a set of digital images 905 that were captured by a single user with a single digital camera in a short period of time for the specific purpose of constructing the 3-D model 290. For example, the user may desire to construct a 3-D model 290 of a particular object. The user can walk around the object capturing digital images 905 of the object from a variety of different viewpoints. The resulting digital image collection 900 can then be processed according to the method of the present invention to determine the 3-D model 290.

In other embodiments, the digital image collection 900 can include digital images of the scene that were captured by multiple users, by multiple digital cameras, and even at different times. For example, a user might desire to construct a 3-D model of the Lincoln Memorial in Washington, D.C. The user can perform an Internet search according to a defined search request, and can locate a set of images of the Lincoln Memorial that were captured by different photographers from a variety of different camera positions.

The digital image collection 900 can include digital images 905 captured with a digital still camera. The digital image collection 900 can also include digital images 905 that correspond to video frames from one or more digital videos captured with a digital video camera.

In some embodiments, an optional discard low quality images step 910 can be used to discard any digital images 905 that have an image quality level lower than some predefined threshold. This step is analogous to the discard low quality video frames step 225 in FIG. 2, and can use any method known in the art for analyzing a digital image to determine a corresponding image quality metric, such as the method described in the aforementioned U.S. Pat. No. 7,764,844. In various embodiments, the image quality metric values can be determined based on estimating image quality attributes such as image sharpness, image blur, image noise, or combinations thereof.

Next, a select image set step 915 is used to select a subset of the digital images 905 in the digital image collection 900 to form a digital image set 920. In a preferred embodiment, the select image set step 915 analyzes the digital images 905 to determine which one have overlapping scene content with each other. In a preferred embodiment, this is accomplished by analyzing pairs of digital images 905 to identify sets of corresponding features using a feature matching algorithm, such as the method described by Lowe in the aforementioned article entitled "Distinctive image features from scale-invariant keypoints." A pair of images are designated as having overlapping scene content if they are determined to contain more than a threshold number of corresponding features (e.g., SIFT features).

In a preferred embodiment, the select image set step 915 selects the digital image set 920 such that each digital image 905 in the digital image set 920 contains overlapping scene content with at least one other digital image 905 in the digital image set 920. Furthermore, the selected digital images 905 overlap to cover a contiguous portion of the scene.

In some cases, all of the digital images 905 in the digital image collection 900 can cover a single contiguous portion of the scene. In such instances, the digital image set 920 can include all of the digital images 905 in the digital image collection 900.

In other cases, the digital image collection 900 may contain two or more subsets of digital images 905, which each overlap to cover a contiguous portion of the scene, but which are not contiguous with each other. For example, there may be a subset of the digital images 905 that are captured of the front side of the Lincoln Memorial, and another subset of the digital image 905 that are captured of the rear side of the Lincoln Memorial, but there may be no digital images of the sides of the Lincoln Memorial. In this case, the select image set step 915 would select one of the contiguous subsets for inclusion in the digital image set 920. In some embodiments, a user interface can be provided to enable a user to select which contiguous subset should be used to build the 3-D model 290.

A determine camera positions step 930 is used to analyze the digital images 905 in the digital image set 920 to determine corresponding camera positions 935. This step is analogous to the determine camera positions step 210 of FIG. 2. In a preferred embodiment, the camera positions 935 are determined by using a "structure-from-motion" (SFM) algorithm such as that described in the aforementioned article by Snavely et al. entitled "Photo tourism: Exploring photo collections in 3-D." As discussed earlier, such methods generally work by analyzing pairs of digital images 905 to determine corresponding features in the two digital images 905. The relative camera positions 935 can then be determined from the pixel positions of the corresponding features.

An optional discard redundant images step 940 can optionally be used to discard any redundant digital images 905 that were captured from similar camera positions 935. This step is not required but can be helpful to improve the processing efficiency of future steps. In some embodiments, the discard redundant images step 940 determines whether the camera positions 935 for a pair of digital images 905 are separated by less than a predefined distance threshold, and if so, one of the digital images 905 is removed from the digital image set 920. In some cases, the digital images 905 are evaluated according to an image quality criterion to determine which one should be retained and which should be removed. The image quality criterion can evaluate various image quality attributes such as resolution, sharpness, blur or noise. This process can be repeated iteratively until there are no remaining pairs of digital images 905 in the digital image set 920 that are separated by less than the distance threshold.

Next, a determine target camera positions step 945 is used to analyze the camera positions 935 of the digital images 905 in the digital image set 920 to determine a set of target camera positions 950. In various embodiments, this step can be performed using a variety of different algorithms. The target camera positions 950 are selected digital images 905 captured at the target camera positions 950 will each have at least a threshold level of overlapping scene content with at least one other digital image 905 captured at a different target camera position 950.

In some embodiments, the determine target camera positions step 945 uses a process similar to the method which was discussed relative to FIG. 2. This method involved determining a distance interval 250 (FIG. 2) and then defining the target camera positions 260 (FIG. 2) based on the distance interval.

In some cases the camera positions 935 determined for the digital images 905 may all lie roughly along a camera path. For example, this could correspond to the case where a photographer walked around a building and capturing digital images 905 from a variety of camera positions. In such cases, a smoothed camera path can be fit to the determined camera positions 935 using a process analogous to that described relative to the determine smoothed camera path step 235 in FIG. 2. An appropriate distance interval can then be determined using a process analogous to the determine distance interval step 245 of FIG. 2, wherein the distance interval is determined such that a pair of digital images 905 captured at camera positions separated by the distance interval have at least a threshold level of overlapping scene content. The target camera positions 950 can then be determined by sampling the smoothed camera path based on the distance interval.

In other cases, the camera positions 935 determined for some or all of the digital images 905 in the digital image set 920 may not lie along a continuous camera path. For example, a digital image set 920 containing digital images 905 captured of an object from a variety of camera positions 935 may include digital images 905 captured of each side of the object captured from different elevation angles. In this case, it would not be possible to connect the camera positions 935 by a smooth camera path. It is therefore not possible to space the target camera positions out along a camera path. However, the goal of spacing the target camera positions out as far as possible while still providing the target level of overlapping scene content is still valid. In some embodiments, a distance threshold is determined, and an iterative process is then used to discard any camera positions 935 that are closer than the distance threshold from another camera position 935 until the remaining camera positions 935 are spaced apart appropriately. The remaining camera positions 935 can then be designated to be the target camera positions 950.

In an alternate embodiment, the target camera positions 950 are determined using a clustering algorithm. Any type of clustering algorithm known in the art can be used, such as the well-known "K-means clustering algorithm" which aims to partition N observations into K clusters, in which each observation belongs to the cluster with the nearest mean. By applying a K-means clustering algorithm to the camera positions 935, a set of K camera position clusters are formed by grouping together nearby camera positions 925.

Figure 10:
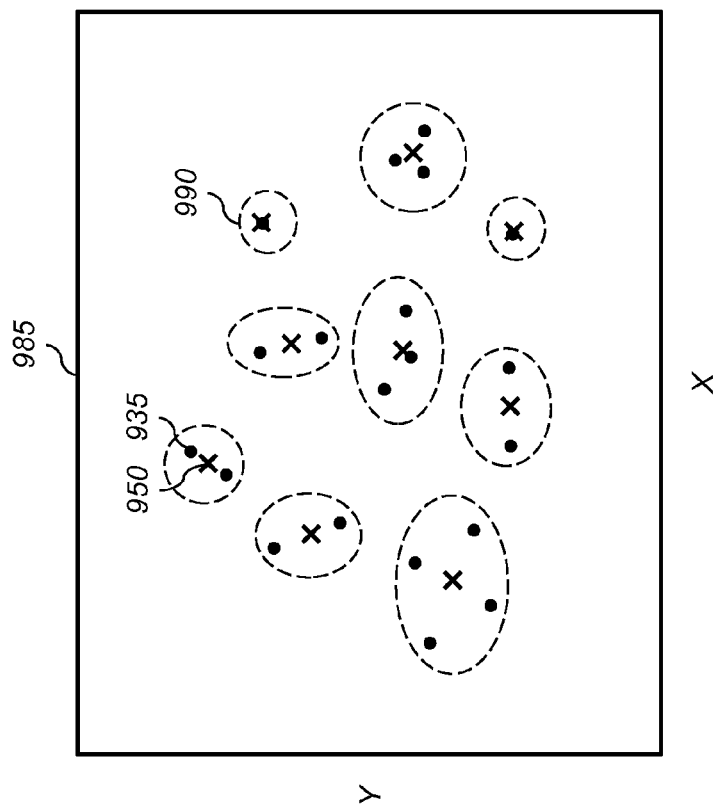
FIG. 10 is a graph showing a set of camera position clusters.

FIG. 10 shows a graph 985 corresponding to an example where a set of camera positions 935 corresponding to a set of digital images 905 are spaced out in pseudo-random arrangement. (While FIG. 10 shows two-dimensions of the camera positions 935, in general, the camera positions 935 will typically vary in a third dimension as well. Applying a K-means algorithm to the camera positions 935 provides K camera position clusters 935. Some of the camera position clusters 990 include only a single camera position 935, while others include a plurality of camera positions 935.

A target camera position 950 is then defined within each of the camera position clusters 990. In some embodiments, the target camera position 950 for a particular camera position cluster 990 is defined to be the centroid of the corresponding camera positions 935. In other embodiments, the target camera positions can be defined using other approaches. For example, the camera position 935 closest to the centroid can be designated to be the target camera position 950.

In some embodiments, a fixed number of camera position clusters 990 can be predefined. However, in order to insure that the target digital images 965 have a sufficient level of overlapping scene content, a conservative number of camera position clusters 990 would need to be used. In other embodiments, the number of camera position clusters 990 can be determined adaptively. In one such embodiment, the number of camera position clusters 990 is adjusted iteratively until an overlapping scene content criterion is satisfied. For example, a small number of camera position clusters 990 can be used in a first iteration, and then the number of camera position clusters 990 can be gradually increased until each of the target digital images 965 corresponding to the target camera positions 950 has at least a target level of overlapping scene content with at least one other target digital image 965.

Returning to a discussion of FIG. 9, once the target camera positions have been defined, a select target digital images step 955 is used to select the target digital images 965 from the digital image set 920 based on the target camera positions 950. In a preferred embodiment, the target digital images 965 are those digital images 905 having camera positions 935 closest to the target camera positions 950. Each target digital image 965 will have a corresponding camera position 970.

Once the set of target digital images 960 has been selected, a construct 3-D model step 975 is used to analyze the target digital images 965 using a 3-D reconstruction process to determine the 3-D model 980. In a preferred embodiment, the construct 3-D model step 975 uses the same method for constructing the 3-D model 980 that was discussed with respect to the construct 3-D model step 285 of FIG. 2.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 110 data processing system
120 peripheral system
130 user interface system
140 data storage system
200 digital video
205 video frame
210 determine camera positions step
215 camera path
220 camera position
225 discard low quality video frames step
230 discard redundant video frames step
235 determine smoothed camera path step
240 smoothed camera path
245 determine distance interval step
250 distance interval
255 determine target camera positions step
260 target camera positions
265 select target video frames step
270 set of target video frames
275 target video frame
280 camera position
285 construct 3-D model step
290 3-D model
300 graph
305 inset region
310 inset graph
315 redundant camera positions
320 graph
325 non-redundant path
330 non-redundant camera positions
400 graph
410 graph
600 graph
610 point cloud
700 select key video frames step
710 set of key video frames
715 key video frame
800 determine color histograms step
805 color histograms
810 determine motion vectors step
815 motion vectors
820 determine image quality metrics step
825 image quality metrics
830 determine distance metrics step
835 distance metrics
840 designate key video frames step
845 key video frame selection criterion
900 digital image collection
905 digital image
910 discard low quality images step
915 select image set step
920 digital image set
930 determine camera positions step
935 camera positions
940 discard redundant images step
945 determine target camera positions step
950 target camera positions
955 select target digital images step
960 target digital images
965 target digital image
970 camera position
975 construct 3-D model step
980 3-D model
985 graph
990 camera position cluster

The invention claimed is:

1. A method for determining a three-dimensional model of a scene from a collection of digital images, comprising:
   receiving a collection of digital images of a scene, wherein the collection of digital images includes a plurality of digital images captured from a variety of camera positions;
   selecting a set of the digital images from the collection of digital images, wherein each digital image in the set of digital images contains overlapping scene content with at least one other digital image in the set of digital images, and wherein the set of digital images overlap to cover a contiguous portion of the scene;
   analyzing pairs of digital images from the set of digital images to determine a camera position for each digital image in the set of digital images;
   determining a set of target camera positions based on the determined camera positions such that digital images captured at the target camera positions will each have at least a target level of overlapping scene content with at least one other digital image captured at a different target camera position;
   selecting a set of target digital images from the set of digital images based on the target camera positions; and
   analyzing the target digital images using a three-dimensional reconstruction process to determine a three-dimensional model of the scene;
   wherein the method is implemented at least in part by a data processing system.

2. The method of claim 1 wherein the step of determining the set of target camera positions includes:
   determining a distance interval such that a pair of digital images captured at camera positions separated by the distance interval have at least a threshold level of overlapping scene content; and
   determining the set of target camera positions based on the distance interval.

3. The method of claim 2 wherein a smooth camera path is fit to the determined camera positions, and the set of target camera positions are determined by sampling the smoothed camera path based on the distance interval.

4. The method of claim 1 wherein the step of determining the set of target camera positions includes:
   applying a k-means clustering algorithm to the determined camera positions to determine a plurality of camera position clusters; and
   determining a target camera position within each of the camera position clusters.

5. The method of claim 4 wherein the target camera within each particular camera position cluster is the centroid of the camera positions within the camera position cluster.

6. The method of claim 4 wherein the number of camera position clusters is adjusted iteratively until an overlapping scene content criterion is satisfied.

7. The method of claim 6 wherein the overlapping scene content criterion requires that each of the target digital images determined based on the target camera positions has at least a target level of overlapping scene content with at least one other target digital image.

8. The method of claim 1 wherein the level of overlapping scene content is characterized by a number of matching features for two video frames, and wherein the target level of overlapping scene content is defined by a target number of matching features.

9. The method of claim 1 wherein the level of overlapping scene content is characterized by a size of an overlap area between two video frames, and wherein the target level of overlapping scene content is defined by a target overlap area size.

10. The method of claim 1 wherein the camera positions for the digital images are determined by analyzing the image pixels of the digital images.

11. The method of claim 10 wherein the camera positions are determined using a structure-from-motion algorithm.

12. The method of claim 1 wherein the collection of digital images is retrieved from the internet in response to a user-defined search request.

13. The method of claim 1 wherein the collection of digital images includes video frames from one or more digital videos.

14. The method of claim 1 wherein selected target digital images are the digital images having associated camera positions which are closest to the target camera positions.

15. The method of claim 1 wherein the three-dimensional reconstruction process is a multi-view-stereo reconstruction process.

16. The method of claim 1 wherein the three-dimensional model is a three-dimensional point cloud model or a three-dimensional mesh model.

17. The method of claim 1 further including:
   analyzing the camera positions to identify digital images having redundant camera positions; and
   discarding at least some of the identified digital images having the redundant camera positions.

18. The method of claim 17 wherein two camera positions are designated to be redundant if they are less than a predetermined distance away from each other.

19. The method of claim 1 further including:
   analyzing the video frames to determine corresponding image quality metric values, and
   discarding video frames having image quality metric values that are less than a predefined threshold.

20. The method of claim 19 wherein the image quality metric values are determined based on estimating image sharpness, image blur or image noise.

* * * * *